(12) United States Patent
Yang et al.

(10) Patent No.: US 11,848,726 B2
(45) Date of Patent: Dec. 19, 2023

(54) MODE SWITCHING METHOD FOR REDUCING TRAINING OVERHEADS IN RECONFIGURABLE INTELLIGENT SURFACE (RIS)-ASSISTED COMMUNICATION SYSTEM

(71) Applicants: NANTONG RESEARCH INSTITUTE FOR ADVANCED COMMUNICATION TECHNOLOGIES CO., LTD., Nantong (CN); NANTONG UNIVERSITY, Nantong (CN)

(72) Inventors: Yongjie Yang, Nantong (CN); Kai Li, Nantong (CN); Jing Wang, Nantong (CN); Shuaifeng Lu, Nantong (CN); Jue Wang, Nantong (CN); Qiang Sun, Nantong (CN); Ning Ge, Nantong (CN); Yanqiu Zhang, Nantong (CN)

(73) Assignees: NANTONG RESEARCH INST FOR ADV COMM TECH CO., LTD., Nantong (CN); NANTONG UNIVERSITY, Nantong (CN)

( * ) Notice: Subject to any disclaimer, the term of this patent is extended or adjusted under 35 U.S.C. 154(b) by 0 days.

(21) Appl. No.: 17/926,061

(22) PCT Filed: Jul. 21, 2022

(86) PCT No.: PCT/CN2022/106911
§ 371 (c)(1),
(2) Date: Nov. 17, 2022

(87) PCT Pub. No.: WO2023/071313
PCT Pub. Date: May 4, 2023

(65) Prior Publication Data
US 2023/0361816 A1    Nov. 9, 2023

(30) Foreign Application Priority Data
Oct. 29, 2021  (CN) .......................... 202111274155.0

(51) Int. Cl.
*H04B 7/04* (2017.01)
*H04L 25/02* (2006.01)

(52) U.S. Cl.
CPC ..... *H04B 7/04013* (2023.05); *H04L 25/0202* (2013.01)

(58) Field of Classification Search
CPC ........................ H04B 7/04013; H04L 25/0202
See application file for complete search history.

(56) References Cited

U.S. PATENT DOCUMENTS

2017/0325208 A1* 11/2017 Xin ...................... H04W 72/20
2021/0013619 A1*  1/2021 Alkhateeb ............ H01Q 15/148
2022/0052764 A1*  2/2022 Medra .................. H04B 10/541

FOREIGN PATENT DOCUMENTS

CN    111294095 A    6/2020
CN    112564758 A    3/2021
(Continued)

OTHER PUBLICATIONS

International Search Report, PCT/CN2022/106911, dated Oct. 19, 2022, 4 pages.
(Continued)

*Primary Examiner* — Sung S Ahn (57) ABSTRACT

The present disclosure provides a mode switching method for reducing training overheads in a reconfigurable intelligent surface (RIS)-assisted communication system. The system includes one single-antenna base station, one single-antenna user terminal, and an RIS including N reflection elements, the single-antenna user terminal sends data to the single-antenna base station, however, when a direct link of a user-base station is blocked by a blockage, the data can be
(Continued)

sent to the single-antenna base station only via the RIS; the RIS determines a proper reflection solution by using a controller, and dynamically adjusts a phase shift thereof to improve an achievable data rate of the system; and necessary information for phase shift adjustment can be obtained at the base station by uplink training, and transmitted to the RIS controller by using a control link.

5 Claims, 5 Drawing Sheets

(56) References Cited

FOREIGN PATENT DOCUMENTS

| | | |
|---|---|---|
| CN | 112769719 A | 5/2021 |
| CN | 112929302 A | 6/2021 |
| CN | 13179232 A | 7/2021 |
| CN | 113055816 B | 11/2021 |
| CN | 113709070 B | 1/2022 |
| CN | 113300747 B | 6/2022 |
| WO | 2017000752 A1 | 1/2017 |

OTHER PUBLICATIONS

Zhi et al., "Statistical CSI-Based Design for Reconfigurable Intelligent Surface-Aided Massive MIMO Systems W.ith Direct Links," IEEE Wireless Communications Letters, vol. 10, Issue 5, May 2021, pp. 1128-1132.

\* cited by examiner

MODE SWITCHING METHOD FOR REDUCING TRAINING OVERHEADS IN RECONFIGURABLE INTELLIGENT SURFACE (RIS)-ASSISTED COMMUNICATION SYSTEM

CROSS REFERENCE TO RELATED APPLICATION(S)

This patent application is a U.S. National Stage Application under 35 U.S.C. 371 of PCT Application No. PCT/CN2022/106911, filed Jul. 21, 2022, which claims priority to Chinese Patent Application No. 202111274155.0, filed with the China National Intellectual Property Administration (CNIPA) on Oct. 29, 2021, and entitled "MODE SWITCHING METHOD FOR REDUCING TRAINING OVERHEADS IN RECONFIGURABLE INTELLIGENT SURFACE (RIS)-ASSISTED COMMUNICATION SYSTEM", which is incorporated herein by reference in its entirety.

TECHNICAL FIELD

The present disclosure relates to the field of communication technologies, and in particular, to a mode switching method for reducing training overheads in an RIS-assisted communication system.

BACKGROUND ART

With commercialization of a fifth generation (5G) mobile communication system, research on a sixth generation (6G) mobile communication technology has been started, pursuing faster and more reliable data transmission and Internet of Everything (IOE). A Reconfigurable Intelligent Surface (RIS) significantly improves spectrum efficiency and energy efficiency of a wireless network by reconfiguring a wireless propagation environment. Specifically, the RIS includes a series of passive elements, and each element may independently cause some changes in an incident signal, such as a phase, an amplitude, and a frequency. When direct communication quality is poor, the RIS intelligently sets a wireless environment, so that signal strength at a target user is enhanced by passive beamforming, and interference in some directions or information leakage can be suppressed.

Physical characteristics of the RIS, despite many advantages, may yet bring new challenges to communication design. In one aspect, to effectively design an RIS phase shift, accurate channel state information of a cascaded channel (that is, a product of channel links of a transmitter-the RIS and the RIS-a receiver) needs to be obtained. However, due to passive reflection of an RIS element, in terms of a training duration, channel training overheads usually increase linearly with the number of RIS elements. Although greater N enables enhanced signal strength, it also results in a longer training duration, which reduces effective data transmission time within a limited coherence time. To reduce training overheads in RIS-assisted communication, one solution is to activate only some RIS elements for transmission, which, however, makes it impossible to take full advantage of the RIS elements. It has been proposed that adjacent RIS elements in transmission are grouped, and elements in a same group are in a same phase shift. According to this method, the training duration can be reduced from N to L<N, where L is a number of groups. By using spatial correlation in RIS channels, design of an RIS phase shift assisted by using statistical channel state information has been widely studied in some scenarios. The statistical channel state information, such as a channel correlation matrix, usually changes slowly over time, so that it can be more easily obtained by long-term estimation. Thus, in this case, overheads of instantaneous channel training can be completely avoided. Based on the foregoing background, the present disclosure proposes a mode switching method for reducing training overheads in an RIS-assisted communication system.

SUMMARY

The present disclosure aims to provide, for disadvantages in the prior art, a mode switching method for reducing training overheads in an RIS-assisted communication system, to dynamically configure a user transmission mode based on user feedback and channel information obtained by a base station. This ensures performance of a communication system in various channel conditions and effectively improves a reachable rate of the system.

To achieve the foregoing objective, a technical solution used in the present disclosure is a mode switching method for reducing training overheads in an RIS-assisted communication system. An innovation of the method is: The system includes one single-antenna base station, one single-antenna user terminal, and an RIS including N reflection elements, where the single-antenna user terminal sends data to the single-antenna base station, however, when a direct link of a user-base station is blocked by a blockage, the data is sent to the single-antenna base station only via the RIS; the RIS determines a proper reflection solution by using a controller, and dynamically adjusts a phase shift thereof to improve an achievable data rate of the system; and necessary information for phase shift adjustment is obtainable at the base station by uplink training, and transmitted to the RIS controller by using a control link, and the method specifically includes the following steps:

step 1: defining a transmission mode: where optimal transmission modes are classified into the following three types: an RIS element selection mode that uses instantaneous channel state information and is denoted as mode 1; an RIS element grouping mode that uses instantaneous channel state information and is denoted as mode 2; and a reflection phase design mode that uses statistical channel state information and is denoted as mode 3;

step 2: obtaining a key parameter: where a user sends a signal s, the signal s arrives at the base station through a cascaded channel of the user-RIS-base station, and at an end of each transmission period, the base station obtains a signal-to-noise ratio (SNR), a channel correlation $\rho$, and a ratio N/T of a number of enabled elements to a coherence time length that are of the user; and step 3: selecting an optimal transmission mode: where by comparing the SNR, the channel correlation $\rho$, and the ratio N/T of a number of enabled elements to a coherence time length obtained according to step 2 with preset thresholds, the base station selects, from step 1, an optimal transmission mode maximizing a user rate.

Further, the necessary information for phase shift adjustment includes at least channel state information of an RIS-related channel, is obtainable at the base station by uplink training, and is transmitted to the RIS controller by using a dedicated control link.

Further, in step 1, for the mode 1, only some RIS elements are enabled for transmission, but other elements are disabled; for the mode 2, multiple adjacent RIS elements are connected together to form one group, and then channel training and phase adjustment are performed in group; and for the mode 3, transmission design by using the statistical channel state information avoids instantaneous channel training overheads, where an RIS phase shift is designed to compensate for an estimated phase of an instantaneous cascaded channel.

Further, in step 2, the base station obtains the SNR of the user, the channel correlation $\rho$, and the ratio N/T of a number of enabled elements to a coherence time length; the user sends the known signal s to the base station with a power $P_t$; the channel correlation $|\rho| \leq 1$ indicates a correlation level of two adjacent elements in a same row/column; and it is assumed that the channel is block fading and remains unchanged for a duration of T slots, the "slot" herein is defined as a duration required to train and estimate a cascaded channel of one RIS element, therefore, to estimate cascaded channels of all N elements, a total of N slots are required based on an "on-off" mechanism, and remaining time for data transmission is T-N.

Further, in step 3, by comparing the SNR, the channel correlation $\rho$, and the ratio N/T of a number of enabled elements to a coherence time length obtained according to step 2 with preset corresponding thresholds, the base station selects, from step 1, the optimal transmission mode maximizing the user rate, and selection steps are as follows:

step 3-1: when the obtained channel correlation $\rho$ is greater than a correlation threshold $\rho_{th}$, further checking the ratio N/T of a number of enabled elements to a coherence time length, and if N/T is greater than a first ratio threshold $\alpha_1$, selecting the mode 3 for transmission; if N/T is greater than a second ratio threshold $\alpha_2$ and less than the first ratio threshold $\alpha_1$, further checking the SNR, if the SNR is greater than a first SNR threshold $SNR_1$, selecting the mode 3 for transmission, otherwise, selecting the mode 2 for transmission; or if N/T is less than the second ratio threshold $\alpha_2$, further checking the SNR, if the SNR is less than a second SNR threshold $SNR_2$, selecting the mode 1 for transmission, otherwise, selecting the mode 2 for transmission; and step 3-2: when the obtained channel correlation $\rho$ is less than the correlation threshold $\rho_{th}$, further checking the ratio N/T of a number of enabled elements to a coherence time length, and if N/T is greater than the second ratio threshold $\alpha_2$, selecting the mode 2 for transmission; otherwise, further checking the SNR of the user, and if the SNR is less than the second SNR threshold $SNR_2$, selecting the mode 1 for transmission, otherwise selecting the mode 2 for transmission.

Further, in step 3, the correlation threshold $\rho_{th}$, the ratio thresholds $\alpha_1$ and $\alpha_2$ of the rate of a number of enabled elements to a coherence time length, and the SNR thresholds $SNR_1$ and $SNR_2$ each are obtained by numerical simulation in advance by comparing reachable rates of an involved transmission mode in different channel conditions, where $\alpha_2 < \alpha_1$, and $SNR_2 < SNR_1$; and in a data transmission period, for a user in the mode 1 or the mode 2, instantaneous channel state information of the user is fed back at each transmission moment, and corresponding precoding transmission is performed, and for a user in the mode 3, precoding transmission is performed by using the statistical channel state information; and at the end of this transmission period, based on an SNR, a channel correlation $\rho$, and a ratio N/T of a number of enabled elements to a coherence time length that are updated by the user, the transmission mode of the user is dynamically switched, and transmission is performed based on a corresponding solution in a next transmission period.

The present disclosure has the following beneficial effects.

According to this method, the mode switching method for reducing training overheads includes three modes of the RIS element selection/grouping mode that uses instantaneous channel state information and the mode that is designed by using statistical channel state information, which are comprehensively considered. Therefore, when there is a large number of RIS elements, overheads of channel estimation and training are reduced, and data transmission quality is improved. When the transmission solution using the instantaneous channel state information fails due to channel estimation, a feedback latency, or the like, the statistical channel state information can be used for transmission, to ensure good transmission performance. The RIS is fully used, and by comparing the obtained parameter with the pre-simulated threshold, the optimal transmission solution is selected, to improve a reachable rate of the system.

DETAILED DESCRIPTION OF THE EMBODIMENTS

The present disclosure is further described below with reference to the accompanying drawings.

To make the objectives, technical solutions, and advantages of the present disclosure clearer, the present disclosure is further described below in detail with reference to the drawings and specific implementations. It should be understood that the specific implementations described herein are merely intended to explain rather than limit the present disclosure.

In a mode switching method for reducing training overheads in an RIS-assisted communication system, according to a principle of maximizing an achievable ergodic rate of the system, dynamic switching is performed in three modes: an RIS element selection mode that uses instantaneous channel state information (denoted as mode 1), an RIS element grouping mode that uses instantaneous channel state information (denoted as mode 2), and a reflection phase design mode that uses statistical channel state information (denoted as mode 3), including the following steps: step 1: define a transmission mode: where optimal transmission modes are classified into the following three types: the RIS element selection mode that uses instantaneous channel state information and is denoted as the mode 1; the RIS element grouping mode that uses instantaneous channel state information and is denoted as the mode 2; and the reflection phase design mode that uses statistical channel state information and is denoted as the mode 3; step 2: obtain a key parameter: where a user sends a signal s, the signal s arrives at a base station through a cascaded channel of the user-RIS-base station, and at an end of each transmission period, the base station obtains an SNR of the user, a channel correlation ρ, and a ratio N/T of a number of enabled elements to a coherence time length; and step 3: select an optimal transmission mode: where by comparing the SNR, the channel correlation ρ, and the ratio N/T of a number of enabled elements to a coherence time length obtained according to step 2 with preset corresponding thresholds, the base station selects, from step 1, an optimal transmission mode maximizing a user rate.

The present disclosure provides the mode switching method for reducing training overheads in an RIS-assisted communication system. The system includes one single-antenna base station, one single-antenna user terminal, and an RIS including N reflection elements. The single-antenna user terminal sends data to the single-antenna base station. However, when a direct link of a user-base station is blocked by a blockage, the data can be sent to the single-antenna base station only via the RIS. The RIS determines a proper reflection solution by using a controller, and dynamically adjusts a phase shift thereof to improve an achievable data rate of the system. Necessary information for phase shift adjustment, for example, channel state information of an RIS-related channel, can be obtained at the base station by uplink training, and transmitted to the RIS controller by using a dedicated control link. According to this method, the statistical channel state information and the instantaneous channel state information are comprehensively used, and an RIS reflection solution is properly selected. The method specifically includes the following steps:

Step 1: Define a transmission mode. Optimal transmission modes are classified into the following three types: an RIS element selection mode that uses instantaneous channel state information and is denoted as mode 1; an RIS element grouping mode that uses instantaneous channel state information and is denoted as mode 2; and a reflection phase design mode that uses statistical channel state information and is denoted as mode 3.

Step 2: Obtain a key parameter. A user sends a signal s, and the signal s arrives at the base station through a cascaded channel of the user-RIS-base station. At an end of each transmission period, the base station obtains an SNR of the user, a channel correlation ρ, and a ratio N/T of a number of enabled elements to a coherence time length.

Step 3: Select an optimal transmission mode. By comparing the SNR, the channel correlation ρ, and the ratio N/T of a number of enabled elements to a coherence time length obtained according to step 2 with preset corresponding thresholds, the base station selects, from step 1, an optimal transmission mode maximizing a user rate.

According to the foregoing method, in step 1, for the mode 1, only some RIS elements are enabled for transmission, but other elements are disabled. For the mode 2, multiple adjacent RIS elements are connected together to form one group, and then channel training and phase adjustment are performed in group. For the mode 3, transmission design by using the statistical channel state information avoids instantaneous channel training overheads, where an RIS phase shift is designed to compensate for an estimated phase of an instantaneous cascaded channel.

According to the foregoing method, in step 2, the key parameter is obtained. The user sends the known signal s to the base station with a power $P_1$. The channel correlation $|\rho| \leq 1$ indicates a correlation level of two adjacent elements in a same row/column. It is assumed that the channel is block fading and remains unchanged for a duration of T slots. The "slot" herein is defined as a duration required to train and estimate a cascaded channel of one RIS element. Therefore, to estimate cascaded channels of all N elements, a total of N slots are required based on an "on-off" mechanism, and remaining time for data transmission is T-N. The statistical channel state information, such as a channel correlation matrix, is usually considered to be available at lower costs through long-term measurements.

According to the foregoing method, in step 3, the optimal transmission mode is selected. By comparing the SNR, the channel correlation ρ, and the ratio N/T of a number of enabled elements to a coherence time length obtained according to step 2 with preset corresponding thresholds, the base station selects, from step 1, the optimal transmission mode maximizing the user rate. Selection steps are as follows:

Step 3-1: When the obtained channel correlation ρ is greater than a correlation threshold $\rho_{th}$, further check the ratio N/T of a number of enabled elements to a coherence time length, and if N/T is greater than a first ratio threshold $\alpha_1$, select the mode 3 for transmission; if N/T is greater than a second ratio threshold $\alpha_2$ and less than the first ratio threshold $\alpha_1$, further check the SNR, if the SNR is greater than a first SNR threshold $SNR_1$, select the mode 3 for transmission, otherwise, select the mode 2 for transmission; or if N/T is less than the second ratio threshold $\alpha_2$ further check the SNR, if the SNR is less than a second SNR threshold $SNR_2$, select the mode 1 for transmission, otherwise, select the mode 2 for transmission.

Step 3-2: When the obtained channel correlation ρ is less than the correlation threshold $\rho_{th}$, further check the ratio N/T of a number of enabled elements to a coherence time length, and if N/T is greater than the second ratio threshold $\alpha_2$, select the mode 2 for transmission; otherwise, further check the SNR of the user, and if the SNR is less than the second SNR threshold $SNR_2$ select the mode 1 for transmission, otherwise select the mode 2 for transmission.

According to the foregoing method, the correlation threshold $\rho_{th}$, the ratio thresholds $\alpha_1$ and $\alpha_2$ of the rate of a number of enabled elements to a coherence time length, and the SNR thresholds $SNR_1$ and $SNR_2$ each are obtained by numerical simulation in advance by comparing reachable rates of an involved transmission mode in different channel conditions, where $\alpha_2 < \alpha_1$, and $SNR_2 < SNR_1$. In a data transmission period, for a user in the mode 1 or the mode 2, instantaneous channel state information of the user is fed back at each transmission moment, and corresponding precoding transmission is performed, and for a user in the mode 3, precoding transmission is performed by using the statistical channel state information. At the end of this transmission period, based on an SNR, a channel correlation ρ, and a ratio N/T of a number of enabled elements to a coherence time length that are updated by of the user, the transmission mode of the user is dynamically switched, and transmission is performed based on a corresponding solution in a next transmission period.

Figure 1:
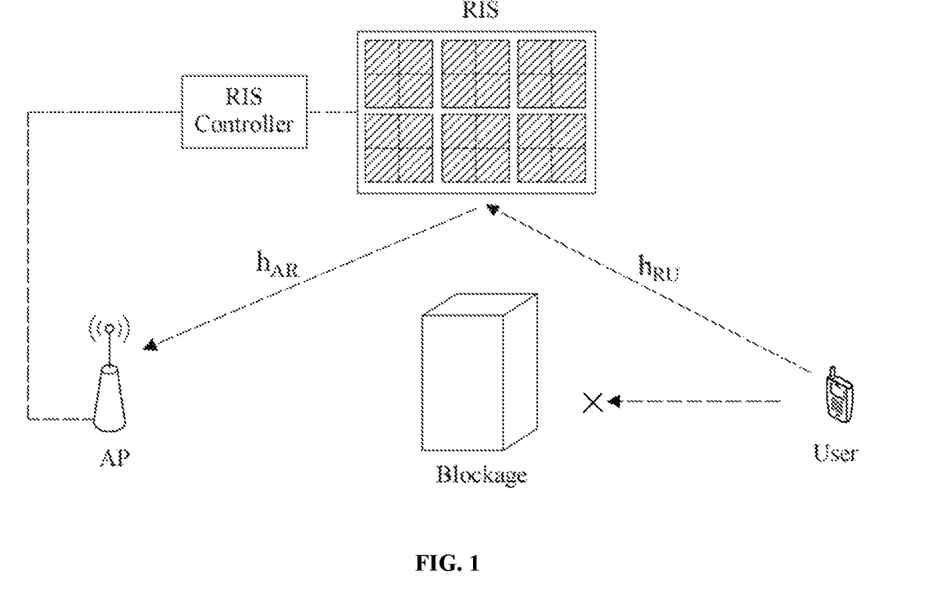
FIG. 1 is a scene diagram of an embodiment of a mode switching method for reducing training overheads in an RIS-assisted communication system according to the present disclosure.

Referring to FIG. 1, a system instance includes one single-antenna base station, one single-antenna user terminal, and an RIS including N reflection elements. A user attempts to send data to the base station. However, a direct link of the user-base station is blocked by a blockage, the data can be sent to the base station only via the RIS. The RIS determines a proper reflection solution by using a controller, and dynamically adjusts a phase shift thereof to improve an achievable data rate of the system. Necessary information for phase shift adjustment, for example, channel state information of an RIS-related channel, can be obtained at the base station by uplink training, and transmitted to the RIS controller by using a dedicated control link.

It is assumed that an $n^{th}$ RIS element adjusts an incident wave phase corresponding to the $n^{th}$ RIS element to $\phi_n$, a received signal at the base station may be written as:

$$y = \sqrt{P_t} \sum_{n=1}^{N} h_{RU,n} h_{AR,n} e^{j\phi_n} s + z, \quad (1)$$

where $h_{RU,n}$ @$h_{RU}[n]$ indicates a user link of the RIS; $h_{AR,n}$ @$h_{AR}[n]$ indicates a base station link of the RIS; and z indicates a noise at a base station.

A cascaded link via the $n^{th}$ element may be represented as:

$$h_{C,n} @ h_{RU,n} h_{AR,n} \quad (2)$$

A cascaded channel vector is defined as $h_C \in \pounds^{1 \times N} =$ $(h_{C,1}, \ldots, h_{C,N})$, and $$h_C = h_{AR} \cdot \text{diag}(h_{RU}) \quad (3)$$

A correlation matrix of $h_C$ is defined. The matrix describes correlation coefficients between any two cascaded channel links, as follows:

$$R_C @ E[h_C^H h_C]. \quad (4)$$

The following is obtained through simplification:

$$R_C = R_{RU} e R_{AR} \quad (5), \text{ where}$$

e indicates a Hadamard product.

When $h_{C,n}, \forall n$ is known, an optimal phase shift maximizing received signal energy can be represented as:

$$\phi_n^* = \angle (h_{C,n})^* \quad (6), \text{ where}$$

$(\cdot)^*$ indicates a conjugate of a complex variable, and $\angle$ indicates a phase of the complex variable.

For the mode 1, an achievable ergodic rate of the system can be written as:

$$R_{sch1} = \frac{T-M}{T} E\left[\log_2\left(1 + \frac{P_t \left(\sum_{n \in S_{act}} |h_{C,n}|\right)^2}{\sigma^2}\right)\right]. \quad (7)$$

where $S_{act} \subseteq S$ indicates an activated element set, and $|S_{act}| = M \leq N$.

For the mode 2, an achievable ergodic rate of the system can be written as:

$$R_{sch2} = \frac{T-L}{T} E\left[\log_2\left(1 + \frac{P_t \left(\sum_{l}^{L} |h_l^{sum}|\right)^2}{\sigma^2}\right)\right]. \quad (8)$$

It is assumed that elements on the entire RIS are divided into L disjoint groups. A training time has a total of L slots. In a slot l, only an element in G is enabled, and the other groups are disenabled. $h_l^{sum} = \sum_{n \in G} h_{C,n}$ indicates a sum channel of the group. $\phi_l^{group} = \angle (h_l^{sum})^*$ indicates the common phase shift setting shared by the $G_{th}$ group.

For the mode 3, an achievable ergodic rate of the system can be written as:

$$R_{sch3} = E\left[\log_2\left(1 + \frac{P_t}{\sigma^2} |h_{AR} \Phi h_{RU}|^2\right)\right], \quad (9)$$

Figure 2:
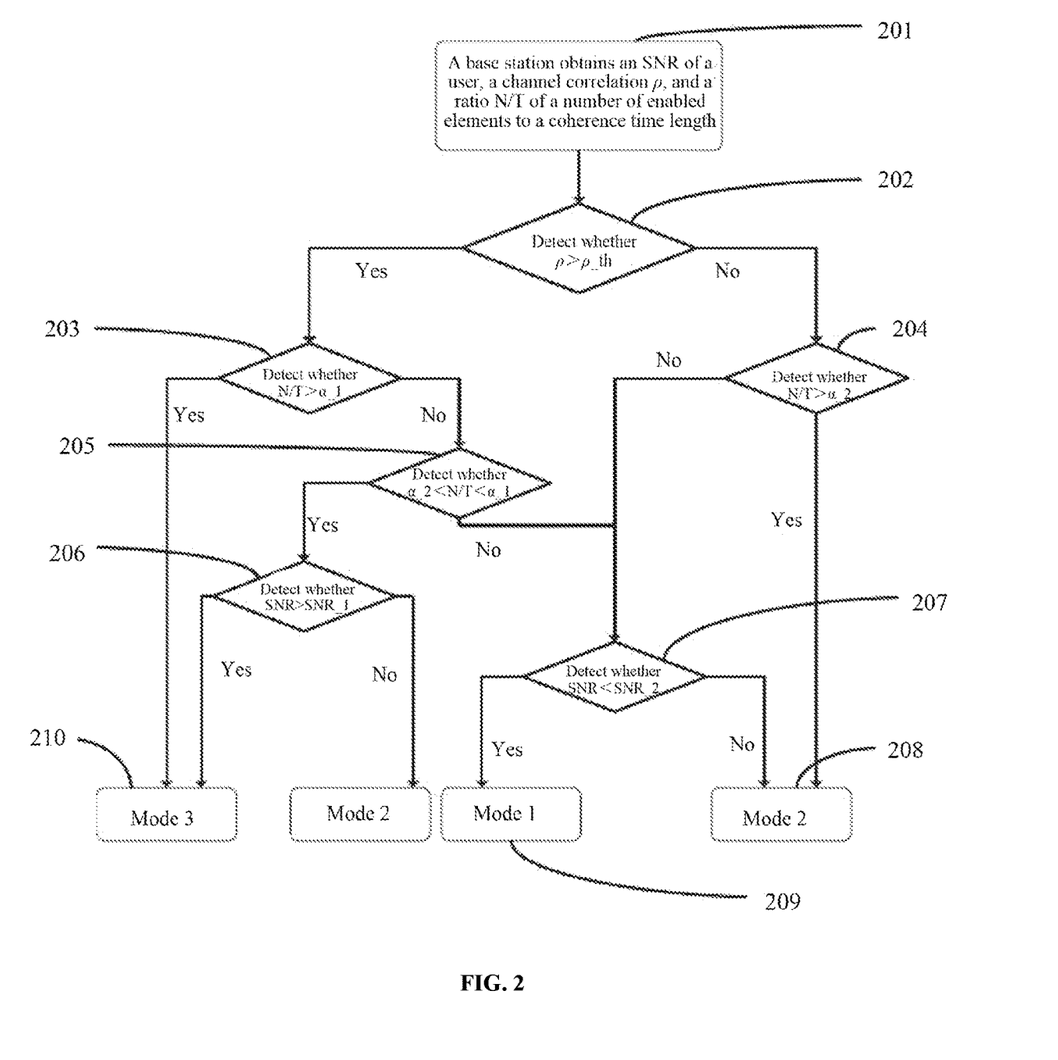
FIG. 2 is a flowchart of an embodiment of a mode switching module in a mode switching method for reducing training overheads in an RIS-assisted communication system according to the present disclosure.

Referring to FIG. 2, there are specifically the following steps:

Step 201: The base station obtains an SNR of the user, a channel correlation $\rho$, and a ratio N/T of a number of enabled elements to a coherence time length.

Step 202: Detect whether $\rho$ is greater than a correlation threshold $\rho_{th}$; and if yes, perform step 203, otherwise, perform step 204.

Step 203: Detect whether N/T is greater than a first ratio threshold $\alpha_1$; and if yes, perform step 210, otherwise, perform step 205.

Step 204: Detect whether N/T is greater than a second ratio threshold $\alpha_2$; and if yes, perform step 208, otherwise, perform step 207.

Step 205: Detect whether N/T is greater than the second ratio threshold $\alpha_2$ and less than the first ratio threshold $\alpha_1$; and if yes, perform step 206, otherwise, perform step 207.

Step 206: Detect whether the SNR is greater than a first SNR threshold $SNR_1$; and if yes, perform step 210, otherwise, perform step 208.

Step 207: Detect whether the SNR is less than a second SNR threshold $SNR_2$; and if yes, perform step 209, otherwise, perform step 208.

Step 208: Select the mode 2 as the transmission mode, that is, the RIS element grouping mode that uses instantaneous channel state information.

Step 209: Select the mode 1 as the transmission mode, that is, the RIS element selection mode that uses instantaneous channel state information.

Step 210: Select the mode 3 as the transmission mode, that is, the reflection phase design mode that uses statistical channel state information.

Figure 3A:
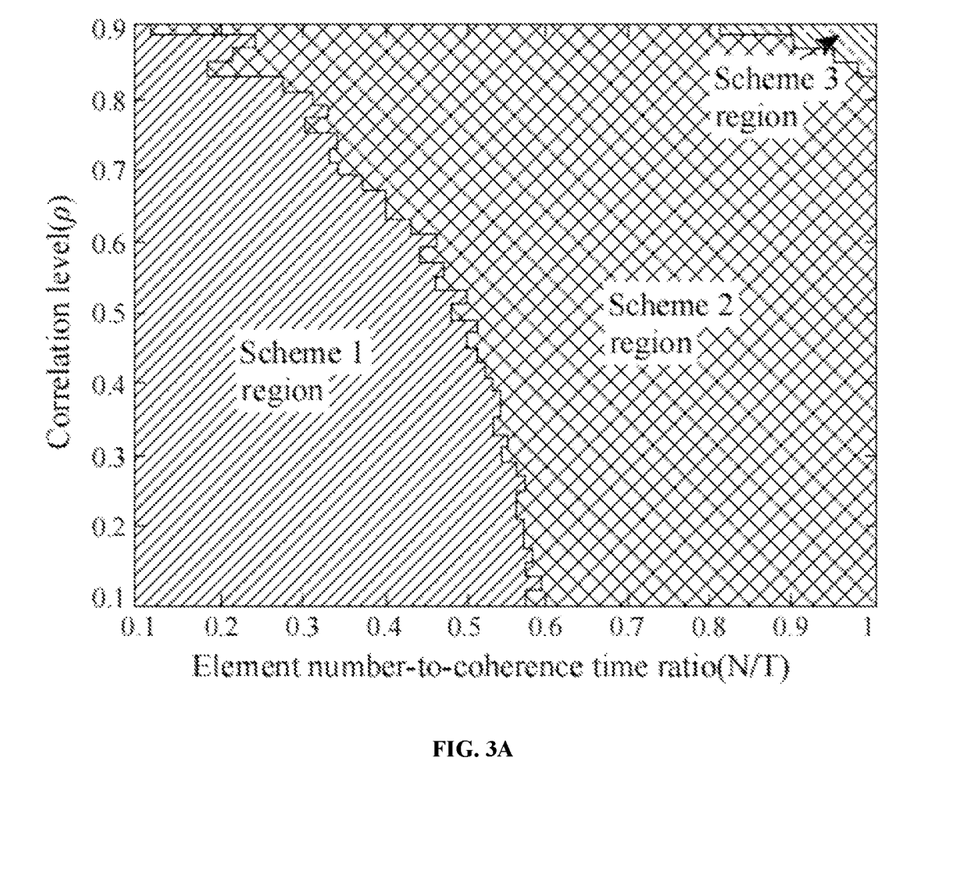
FIG. 3A-C is a division diagram of implementation regions of three modes in a mode switching method for reducing training overheads in an RIS-assisted communication system according to the present disclosure.
Figure 3B:
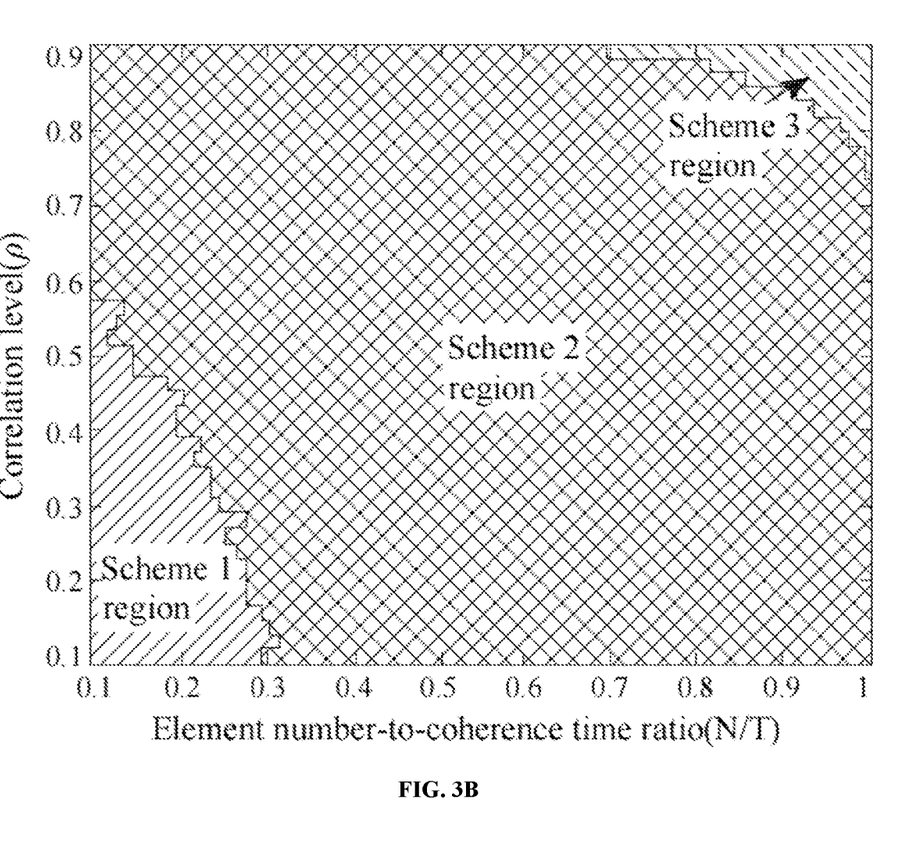
Figure 3C:
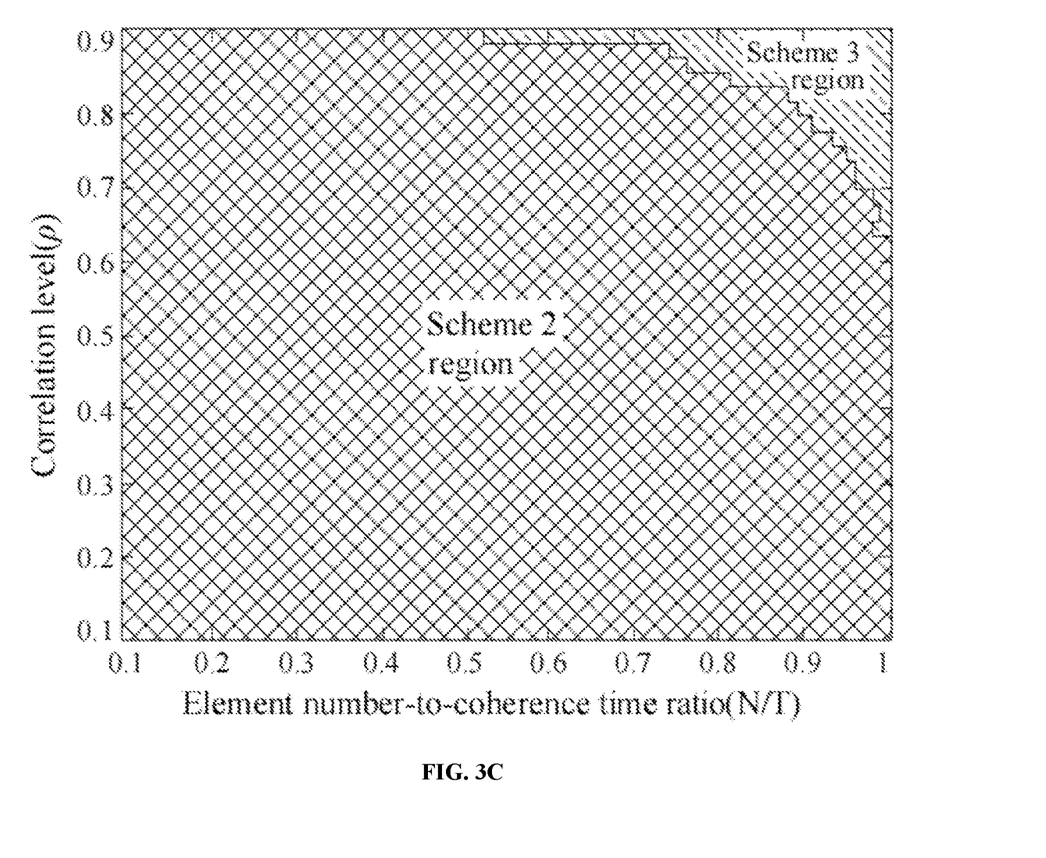

Referring to FIG. 3A-C, for each point ($\rho$, N/T) in the figure, achievable ergodic rates of the three modes are separately calculated, and grids are marked with different colors, which correspond to a mode for implementing a highest rate. An implementation region of the mode 1 usually appears in a region with smaller values of $\rho$ and N/T. An implementation region of the mode 3 appears in a region with larger values of $\rho$ and N/T. A middle region between the implementation regions of the mode 1 and the mode 3 is occupied by the mode 2. FIG. 3A is an implementation region division diagram of the three modes when the SNR is −5 dB. FIG. 3B is an implementation region division diagram of the three modes when the SNR is 10 dB. FIG. 3C is an implementation region division diagram of the three modes when the SNR is 25 dB. It can be learned that, as the SNR increases, the implementation region of the mode 1 decreases and the implementation region of the mode 3 expands.

The above described are merely intended to illustrate the technical solutions of the present disclosure, rather than to construct a limitation to the present disclosure. Those of ordinary skill in the art may make other modifications or equivalent replacements to the technical solutions of the present disclosure without departing from the spirit and scope of the technical solutions of the present disclosure, but such modifications or equivalent replacements should fall within the scope defined by the claims of the present disclosure.

What is claimed is:

1. A mode switching method for reducing training overheads in a reconfigurable intelligent surface (RIS)-assisted communication system, wherein the system comprises one single-antenna base station, one single-antenna user terminal, and an RIS comprising N reflection elements, the single-antenna user terminal sends data to the single-antenna base station, however, when a direct link of a user-base station is blocked by a blockage, the data is sent to the single-antenna base station only via the RIS; the RIS determines a proper reflection solution by using a controller, and dynamically adjusts a phase shift thereof to improve an achievable data rate of the system; and necessary information for phase shift adjustment is obtainable at the base station by uplink training, and transmitted to the RIS controller by using a control link, and the method specifically comprises the following steps:

step 1: defining a transmission mode: wherein optimal transmission modes are classified into the following three types: an RIS element selection mode that uses instantaneous channel state information and is denoted as mode 1; an RIS element grouping mode that uses instantaneous channel state information and is denoted as mode 2; and a reflection phase design mode that uses statistical channel state information and is denoted as mode 3;

step 2: obtaining a key parameter: wherein a user sends a signal s, the signal s arrives at the base station through a cascaded channel of the user-MS-base station, and at an end of each transmission period, the base station obtains a signal-to-noise ratio (SNR), a channel correlation $\rho$, and a ratio N/T of a number of enabled elements to a coherence time length that are of the user; and step 3: selecting an optimal transmission mode: wherein by comparing the SNR, the channel correlation $\rho$, and the ratio N/T of a number of enabled elements to a coherence time length obtained according to step 2 with preset thresholds, the base station selects, from step 1, an optimal transmission mode maximizing a user rate, wherein step 3 specifically comprises:

step 3-1: when the obtained channel correlation $\rho$ is greater than a correlation threshold $\rho_{th}$, further checking the ratio N/T of a number of enabled elements to a coherence time length, and if N/T is greater than a first ratio threshold $\alpha_1$, selecting the mode 3 for transmission; if N/T is greater than a second ratio threshold $\alpha_2$ and less than the first ratio threshold $\alpha_1$, further checking the SNR, if the SNR is greater than a first SNR threshold $SNR_1$, selecting the mode 3 for transmission, otherwise, selecting the mode 2 for transmission; or if N/T is less than the second ratio threshold $\alpha_2$, further checking the SNR, if the SNR is less than a second SNR threshold $SNR_2$, selecting the mode 1 for transmission, otherwise, selecting the mode 2 for transmission; and step 3-2: when the obtained channel correlation $\rho$ is less than the correlation threshold $\rho_{th}$, further checking the ratio N/T of a number of enabled elements to a coherence time length, and if N/T is greater than the second ratio threshold $\alpha_2$, selecting the mode 2 for transmission; otherwise, further checking the SNR of the user, and if the SNR is less than the second SNR threshold $SNR_2$, selecting the mode 1 for transmission, otherwise selecting the mode 2 for transmission.

2. The mode switching method for reducing training overheads in an RIS-assisted communication system according to claim 1, wherein the necessary information for phase shift adjustment comprises at least channel state information of an RIS-related channel, is obtainable at the base station by uplink training, and is transmitted to the RIS controller by using a dedicated control link.

3. The mode switching method for reducing training overheads in an RIS-assisted communication system according to claim 1, wherein in step 1, for the mode 1, only some RIS elements are enabled for transmission, but other elements are disabled; for the mode 2, multiple adjacent RIS elements are connected together to form one group, and then channel training and phase adjustment are performed in group; and for the mode 3, transmission design by using the statistical channel state information avoids instantaneous channel training overheads, wherein an RIS phase shift is designed to compensate for an estimated phase of an instantaneous cascaded channel.

4. The mode switching method for reducing training overheads in an RIS-assisted communication system according to claim 1, wherein in step 2, the base station obtains the SNR of the user, the channel correlation $\rho$, and the ratio N/T of a number of enabled elements to a coherence time length; the user sends the known signal s to the base station with a power $P_1$; the channel correlation $|\rho| \leq 1$ indicates a correlation level of two adjacent elements in a same row/column; and it is assumed that the channel is block fading and remains unchanged for a duration of T slots, the "slot" herein is defined as a duration required to train and estimate a cascaded channel of one RIS element, therefore, to estimate cascaded channels of all N elements, a total of N slots are required based on an "on-off" mechanism, and remaining time for data transmission is T−N.

5. The mode switching method for reducing training overheads in an RIS-assisted communication system according to claim 1, wherein in step 3, the correlation threshold $\rho_{th}$, the ratio thresholds $\alpha_1$ and $\alpha_2$ of the rate of a number of enabled elements to a coherence time length, and the SNR thresholds $SNR_1$ and $SNR_2$ each are obtained by numerical simulation in advance by comparing reachable rates of an involved transmission mode in different channel conditions, wherein $\alpha_2 < \alpha_1$ and $SNR_2 < SNR_1$; in a data transmission period, for a user in the mode 1 or the mode 2, instantaneous channel state information of the user is fed back at each transmission moment, and corresponding precoding transmission is performed, and for a user in the mode 3, precoding transmission is performed by using the statistical channel state information; and at the end of this transmission period, based on an SNR, a channel correlation $\rho$, and a ratio N/T of a number of enabled elements to a coherence time length that are updated by the user, the transmission mode of the user is dynamically switched, and transmission is performed based on a corresponding solution in a next transmission period.

* * * * *